US008798958B2

(12) United States Patent
Satou et al.

(10) Patent No.: US 8,798,958 B2
(45) Date of Patent: Aug. 5, 2014

(54) ROTATION ANGLE DETECTION DEVICE AND ELECTRIC POWER STEERING SYSTEM

(75) Inventors: Takafumi Satou, Okazaki (JP); Takashi Suzuki, Obu (JP); Yasuhiko Mukai, Anjo (JP); Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 744 days.

(21) Appl. No.: 12/899,967

(22) Filed: Oct. 7, 2010

(65) Prior Publication Data

US 2011/0087456 A1    Apr. 14, 2011

(30) Foreign Application Priority Data

Oct. 9, 2009   (JP) ................................ 2009-234970
Sep. 16, 2010  (JP) ................................ 2010-208040

(51) Int. Cl.
    G01C 9/00      (2006.01)
    G01B 7/30      (2006.01)
    G01D 5/14      (2006.01)
    B62D 5/04      (2006.01)
    G01D 5/244     (2006.01)
    B62D 15/02     (2006.01)

(52) U.S. Cl.
    CPC ............ B62D 15/0235 (2013.01); G01D 5/145 (2013.01); B62D 5/049 (2013.01); G01D 5/24461 (2013.01)
    USPC ...................................... 702/151; 324/207.25

(58) Field of Classification Search
    CPC .......... G01B 7/30; G06F 19/00; B62D 5/049; B62D 15/0235; G01D 5/24461; G01D 5/145

USPC .......... 702/151, 145; 73/862.326; 324/207.25
    See application file for complete search history.

(56) References Cited

U.S. PATENT DOCUMENTS

| 2005/0135035 | A1* | 6/2005 | Tsutsui ........................ 361/93.1 |
| 2006/0136169 | A1* | 6/2006 | Shonai et al. ................. 702/145 |
| 2007/0251332 | A1* | 11/2007 | Noritou ..................... 73/862.326 |
| 2009/0206827 | A1* | 8/2009 | Aimuta et al. ........... 324/207.25 |

FOREIGN PATENT DOCUMENTS

| EP | 1 503 184   | 2/2005 |
| EP | 1 544 579   | 6/2005 |
| EP | 1 544 580   | 6/2005 |
| JP | H06-147922  | 5/1994 |
| JP | 2000-088609 | 3/2000 |

(Continued)

OTHER PUBLICATIONS

Japanese Office Action dated Oct. 28, 2011, issued in corresponding Japanese Application No. 2010-208040 with English translation.

*Primary Examiner* — Michael Nghiem
*Assistant Examiner* — Yoshihisa Ishizuka
(74) *Attorney, Agent, or Firm* — Nixon & Vanderhye PC

(57) ABSTRACT

Bridge circuits have half bridges formed of sensor elements, which vary respective impedances in accordance with a rotating magnetic field generated by a rotary object. A control unit acquires output signals produced from intermediate points of the half bridges, and calculates a rotation angle of the rotary object based on the output signals. The control unit determines that the output signal is abnormal, if a calculation value of the output signal calculated based on at least four output signals is outside a predetermined range. The control unit thus determines which one of the output signals has become abnormal due to failure or the like.

17 Claims, 12 Drawing Sheets

(56) References Cited

FOREIGN PATENT DOCUMENTS

| JP | 2006-105932 | | | 4/2006 |
|----|-------------|---|---|--------|
| JP | 2006105932 | A | * | 4/2006 |
| JP | 2006-153472 | | | 6/2006 |
| JP | 2006-170837 | | | 6/2006 |
| JP | 2006153472 | A | * | 6/2006 |
| JP | 2007-008299 | | | 1/2007 |
| JP | 2007008299 | A | * | 1/2007 |

* cited by examiner

FIG. 8A
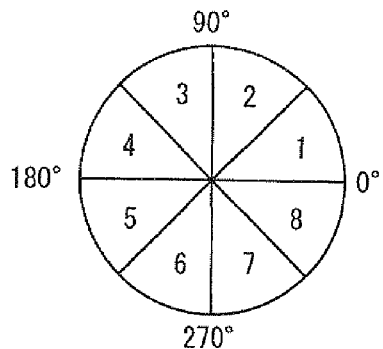
FIG. 8B
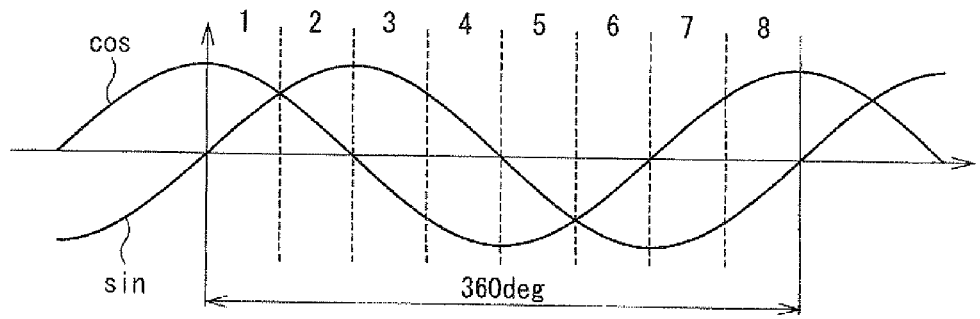
FIG. 9
| AREA | θ | \|Vy\|, \|Vx\| | SIGN OF Vy | SIGN OF Vx | φ- CALCULATION | θ- CALCULATION |
|---|---|---|---|---|---|---|
| 1 | 0≤ θ ≤45 | \|Vy\|≤\|Vx\| | ≥0 | ≥0 | tan | φ |
| 2 | 45< θ ≤90 | \|Vy\|>\|Vx\| | ≥0 | ≥0 | cot | 90−φ |
| 3 | 90< θ ≤135 | \|Vy\|>\|Vx\| | ≥0 | <0 | cot | 90+φ |
| 4 | 135< θ ≤180 | \|Vy\|≤\|Vx\| | ≥0 | <0 | tan | 180−φ |
| 5 | 180< θ ≤225 | \|Vy\|≤\|Vx\| | <0 | <0 | tan | 180+φ |
| 6 | 225< θ ≤270 | \|Vy\|>\|Vx\| | <0 | <0 | cot | 270−φ |
| 7 | 270< θ ≤315 | \|Vy\|>\|Vx\| | <0 | ≥0 | cot | 270+φ |
| 8 | 315< θ <360 | \|Vy\|≤\|Vx\| | <0 | ≥0 | tan | 360−φ |

FIG. 10

| | Ma | Mb | Mc | Md | Me | Mf | Mg | Mh | Mi | Mj |
|---|---|---|---|---|---|---|---|---|---|---|
| (11) $V_{x1a}^2+V_{y1a}^2$ | O | | O | | O | O | O | | O | O |
| (12) $V_{x1a}^2+V_{y2a}^2$ | O | | | O | O | O | | O | O | O |
| (13) $V_{x2a}^2+V_{y1a}^2$ | | O | O | | O | | O | O | O | O |
| (14) $V_{x2a}^2+V_{y2a}^2$ | | O | | O | | O | O | O | O | O |
| ABNORMAL SIGNAL | $V_{x1}$ | $V_{x2}$ | $V_{y1}$ | $V_{y2}$ | $V_{x1}, V_{y1}$ | $V_{x1}, V_{y2}$ | $V_{x2}, V_{y1}$ | $V_{x2}, V_{y2}$ | $V_{x1}, V_{x2}$ | $V_{y1}, V_{y2}$ |
| MODE | Ma | Mb | Mc | Md | Me | Mf | Mg | Mh | Mi | Mj |

FIG. 11

| MODE | ABNORMAL SIGNAL | ABNORMAL-TIME PROCESSING ($\theta$-CALCULATION BY) |
|---|---|---|
| Ma | $V_{x1}$ | $V_{x2}, V_{y1}, V_{y2}$ |
| Mb | $V_{x2}$ | $V_{x1}, V_{y1}, V_{y2}$ |
| Mc | $V_{y1}$ | $V_{x1}, V_{x2}, V_{y2}$ |
| Md | $V_{y2}$ | $V_{x1}, V_{x2}, V_{y1}$ |
| Me | $V_{x1}, V_{y1}$ | $V_{x2}, V_{y2}$ |
| Mf | $V_{x1}, V_{y2}$ | $V_{x2}, V_{y1}$ |
| Mg | $V_{x2}, V_{y1}$ | $V_{x1}, V_{y2}$ |
| Mh | $V_{x2}, V_{y2}$ | $V_{x1}, V_{y1}$ |
| Mi OR Mj | $V_{x1}, V_{x2}$ OR $V_{y1}, V_{y2}$ | $\theta_{st}$ |

FIG. 12A

| EQUATION | (13), (14) | (13) | (14) |
|---|---|---|---|
| ABNORMAL SIGNAL | $V_{x2}$ | $V_{y1}$ | $V_{y2}$ |
| $\theta$-CALCULATION BY | $\theta_{st}$ | $V_{x2}, V_{y2}$ (MODE Me) | $V_{x2}, V_{y1}$ (MODE Mf) |

FIG. 12B

| EQUATION | | (14) | (13) |
|---|---|---|---|
| ABNORMAL SIGNAL | | $V_{x2}$ OR $V_{y2}$ | $V_{x2}$ OR $V_{y1}$ |
| $\theta$-CALCULATION BY | | $\theta_{st}$ | $\theta_{st}$ |

FIG. 14

| | | | | |
|---|---|---|---|---|
| (21) $V_{x11a}^2 + V_{y11a}^2$ | ○ | | ○ | |
| (22) $V_{x11a}^2 + V_{y12a}^2$ | ○ | | | ○ |
| (23) $V_{x12a}^2 + V_{y11a}^2$ | | ○ | ○ | |
| (24) $V_{x13a}^2 + V_{y12a}^2$ | | | ○ | ○ |
| ABNORMAL SIGNAL | $V_{x11}$ | $V_{x12}$ | $V_{x13}$ | $V_{y11}$ | $V_{y12}$ |

FIG. 15

| | | | | |
|---|---|---|---|---|
| (31) $V_{x1y1}^2 + V_{x1y2}^2$ | ○ | | ○ | ○ |
| (32) $V_{x2y1}^2 + V_{x2y2}^2$ | | ○ | ○ | ○ |
| (33) $V_{x1y1}^2 + V_{x2y1}^2$ | ○ | ○ | ○ | |
| (34) $V_{x1y2}^2 + V_{x2y2}^2$ | ○ | ○ | | ○ |
| ABNORMAL SIGNAL | $V_{x1}$ | $V_{x2}$ | $V_{y1}$ | $V_{y2}$ |
| MODE | Ma | Mb | Mc | Md |

FIG. 16

| MODE | ABNORMAL SIGNAL | $\theta$-CALCULATION BY |
|---|---|---|
| Ma | $V_{x1}$ | $V_{x2}, V_{y1}, V_{y2}$ |
| Mb | $V_{x2}$ | $V_{x1}, V_{y1}, V_{y2}$ |
| Mc | $V_{y1}$ | $V_{x1}, V_{x2}, V_{y2}$ |
| Md | $V_{y2}$ | $V_{x1}, V_{x2}, V_{y1}$ |

ROTATION ANGLE DETECTION DEVICE AND ELECTRIC POWER STEERING SYSTEM

CROSS REFERENCE TO RELATED APPLICATION

This application is based on and incorporates herein by reference Japanese patent applications No. 2009-234970 filed on Oct. 9, 2009 and No. 2010-208040 filed on Sep. 16, 2010.

FIELD OF THE INVENTION

The present invention relates to a rotation angle detection device and an electric power steering system using the same.

BACKGROUND OF THE INVENTION

A conventional rotation angle detection device detects a rotation angle of a rotary shaft of a motor, for example, by calculating a rotation angle based on an output signal produced from a sensor element. It is known to determine abnormality when abnormality arises in an output signal of a sensor element (for example, patent document 1).

Patent document 1: JP 2005-49097A (EP 1503184 A2)

According to the technology in patent document 1, sin θ and −sin θ, which are output signals of a bridge circuit, are applied to an adder to generate a signal A, from which sine components are subtracted. Similarly cos θ and −cos θ, which are also output signals of the bridge circuit, are applied to an adder to generate a signal B, from which cosine components are subtracted. Abnormality is determined, if the signal A or B exceeds an upper limit value or falls below a lower limit value. The abnormality is determined based on the signal A or B generated by the adder according to patent document 1. It is however not possible to specify which one of the output signals is abnormal. It is also not possible to detect the rotation angle if one of the cosine signal and the sine signal is lost, because only the other one of the signals remains available.

SUMMARY OF THE INVENTION

It is therefore an object of the present invention to provide a rotation angle detection device capable of specifying a particular output signal, which is abnormal because of failure, and capable of detecting a rotation angle persistently even if failure arises partly. It is another object of the present invention to provide an electric power steering system, which uses such a rotation angle detection device.

According to the present invention, a rotation angle detection device comprises a plurality of bridge circuits and a control unit. The bridge circuits includes a plurality of half bridges. Each of the half bridges includes a sensor element varying an impedance thereof in response to rotating magnetic field generated by rotation of a reference part. The half bridges generate output signals from intermediated points, respectively. The control unit includes a signal acquisition section for acquiring the output signals of the bridge circuits, a rotation angle calculation section for calculating a rotation angle of the reference part based on the output signals acquired by the signal acquisition section, and an abnormality determination section for determining an abnormal signal, which is one of the output signals having abnormality. The abnormality determination section calculates calculation values by using at least four signals of the output signals and determines the abnormal signal among the output signals. The abnormal signal causes the calculation value to be outside a predetermined range.

BRIEF DESCRIPTION OF THE DRAWINGS

The above and other objects, features and advantages of the present invention will become more apparent from the following detailed description made with reference to the accompanying drawings. In the drawings:

FIGS. 8A and 8B are a schematic view showing division of detection angular areas and a signal diagram showing a sine signal and a cosine signal, respectively;

FIG. 9 is a table showing a calculation method of a rotation angle in the first embodiment;

FIG. 10 is a table showing an abnormality output signal determination method in the first embodiment;

FIG. 11 is a table showing abnormal-time processing executed in the first embodiment;

FIGS. 12A and 12B are tables showing an abnormality output signal determination method and abnormal-time processing executed for a second and subsequent abnormality output signals in the first embodiment, respectively;

FIG. 14 is a table showing an abnormality output signal determination method in the second embodiment;

FIG. 15 is a table showing an abnormality output signal determination method in a third embodiment of the present invention;

FIG. 16 is a table showing abnormal-time processing executed in the third embodiment;

DETAILED DESCRIPTION OF THE PREFERRED EMBODIMENT

First Embodiment

Figure 1:
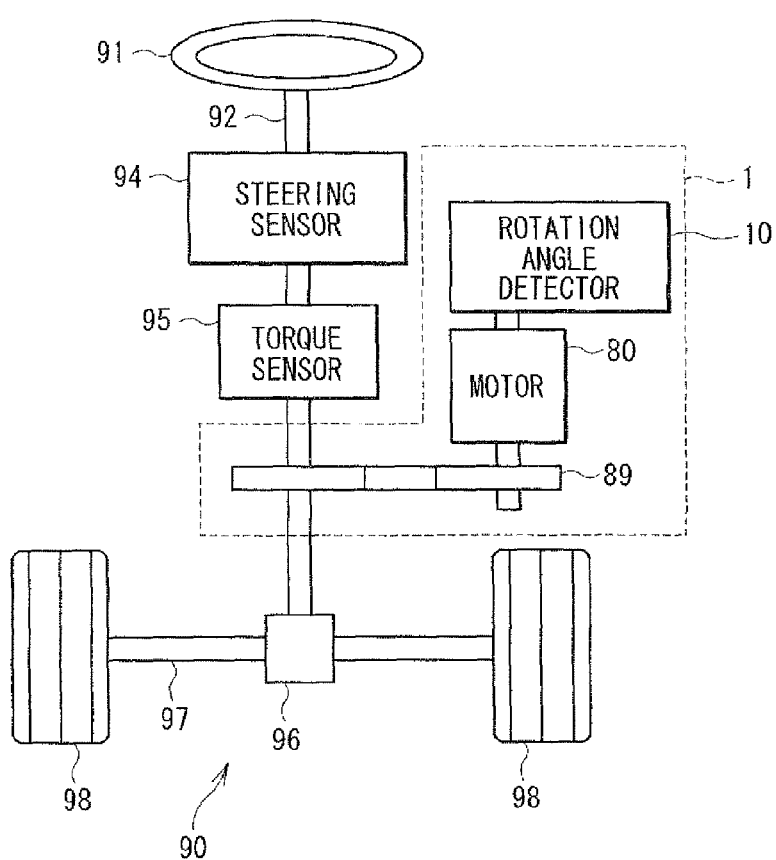
FIG. 1 is a schematic diagram showing an electric power steering system, which uses a rotation angle detection device according to a first embodiment of the present invention.

Referring to FIG. 1, a rotation angle detection device 10 is provided in an electric power steering system (EPS) 1, which power-assists a steering operation in a vehicle.

The electric power steering system 1 forms a part of a steering system 90 of a vehicle, which has a steering wheel 91 and a steering shaft 92 coupled to the steering wheel 91. A steering sensor 94 and a torque sensor 95 are attached to the steering shaft 92. The steering sensor 94 detects a rotation angle (angular position in rotation) of the steering shaft 92. The torque sensor 95 detects a steering torque applied to the steering wheel 91. The end of the steering shaft 92 is coupled to a rack shaft 97 through a gear set 96. A pair of tires (wheels) 98 is coupled to both ends of the rack shaft 97 through tie rods and the like. Rotary motion of the steering shaft 92 is converted into linear motion of the rack shaft by the gear set 96. The tires 98 are steered by an amount corresponding to the amount of linear movement of the rack shaft 97.

The electric power steering system 1 includes an electric motor 80 for generating steering assist torque, a rotation angle detector (detection device) 10 for detecting a rotational angular position of the motor 80, and gears 89 for transferring rotation of the motor 80 to the steering shaft 92 in reduced rotation. The motor is a three-phase brushless motor, which rotates the gears in both forward and reverse directions. The electric power steering system 1 transfers the steering assist torque to the steering shaft 92 in correspondence to the steering direction and steering torque of the steering wheel 91.

Figure 2:
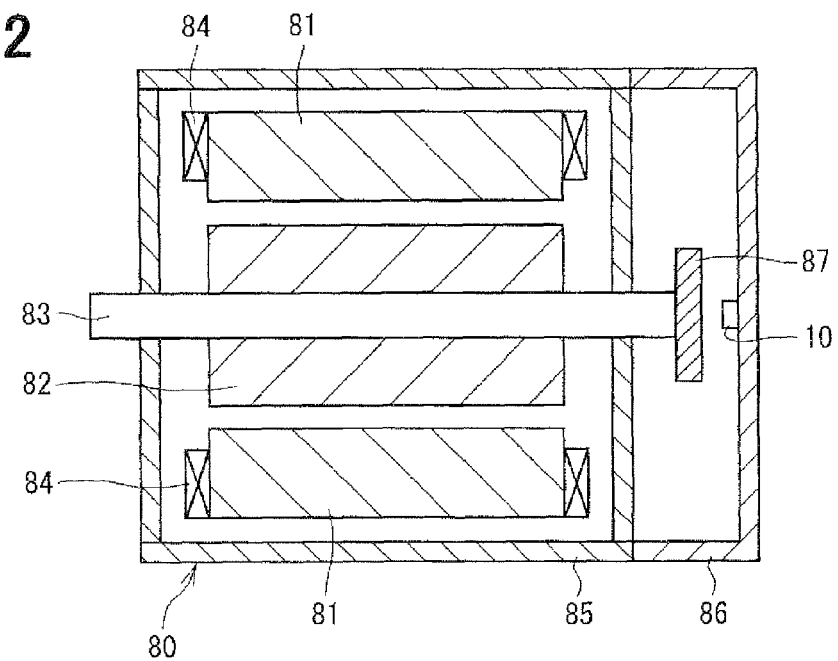
FIG. 2 is a schematic sectional view showing a motor used in the electric power steering system shown in FIG. 1.

As shown in FIG. 2 schematically, the motor 80 includes a stator 81, a rotor 82, a shaft 83 and the like. The rotor 82 is a cylindrical body, which rotates with the shaft 83. The rotor 82 has permanent magnets on its cylindrical surface and magnetic poles. The rotor 82 is provided radially inside the stator 81 and supported rotatably therein. The stator 81 has protrusions, which protrude in a radially inward direction and provided at a predetermined angular interval in a circumferential direction. Coils 84 are wound about the protrusions. The rotor 82 rotates with the shaft 83 and generates rotating magnetic fields, when currents are supplied to the coils of the stator 81. The stator 81, the rotor 82, the shaft 83 and the coils 84 are accommodated within a housing 85. The shaft 83 protrudes outward from both axial ends of the housing 85 and has a reference part 87 at one of its axial ends. The reference part 87 is accommodated within a cover 86. The reference part 87 is a two-pole magnet formed in a disk shape and rotates with the shaft 83. The rotation angle detection device 10 is attached to the cover 86 at a position that faces the reference part 87. In place of one rotation angle detection device 10, a plurality of rotation angle detection devices may be provided on the cover 86. The rotation angle of the reference part 87 indicates the rotation angle of the shaft 83 of the motor 80.

Figure 3:
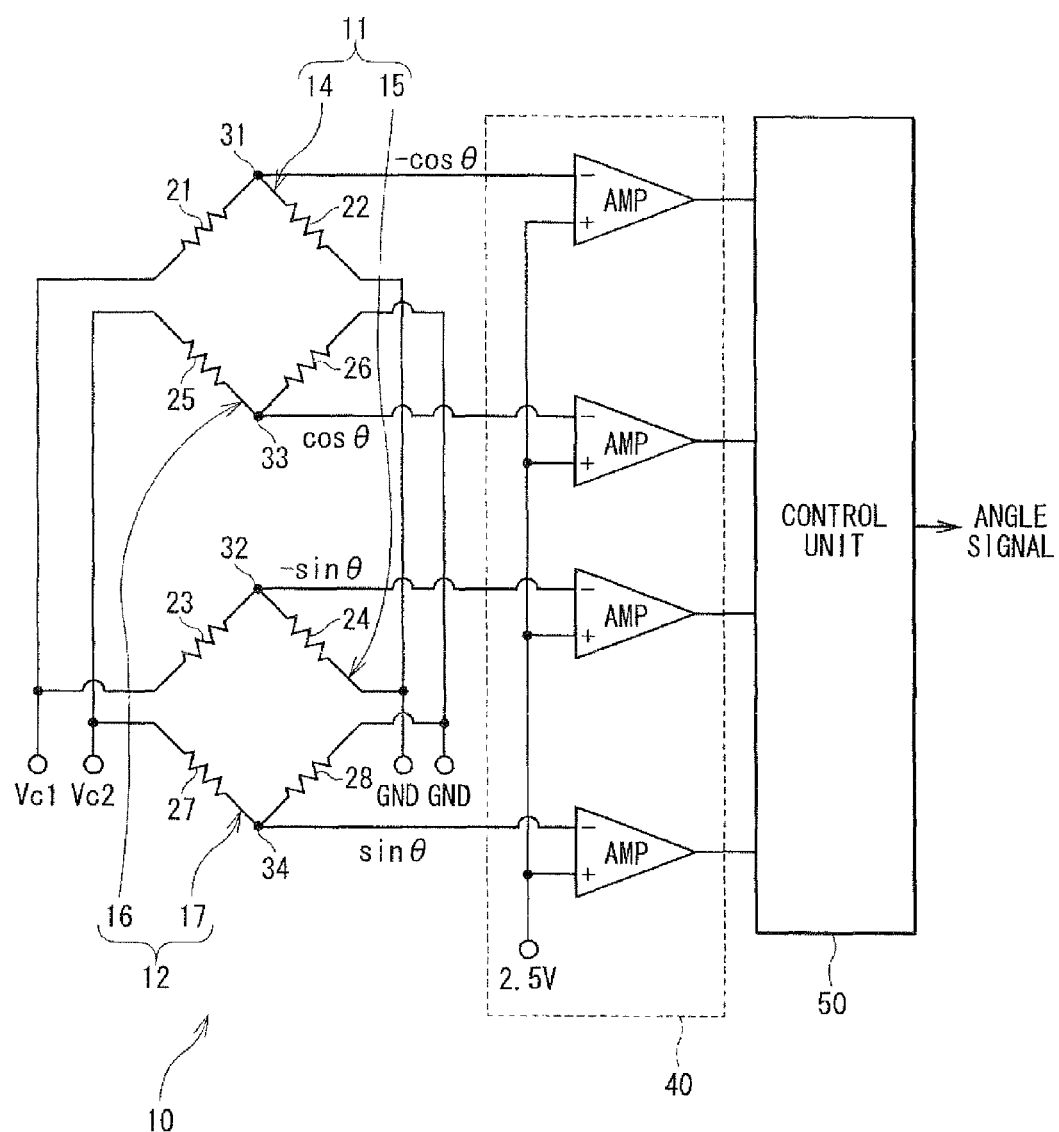
FIG. 3 is a circuit diagram showing the rotation angle detection device according to the first embodiment.

As shown in FIG. 3, the rotation angle detection device 10 includes a first bridge circuit 11, a second bridge circuit 12, an analog amplifier circuit 40, a control unit 50 and the like. The first bridge circuit 11 includes a first half bridge 14 and a second half bridge 15.

The first half bridge 14 is formed of two sensor elements 21 and 22 connected in series. The second half bridge 15 is formed of two sensor elements 23 and 24 connected in series. The second bridge circuit 12 includes a third half bridge 16 and a fourth half bridge 17. The third half bridge 16 is formed of two sensor elements 25 and 26 connected in series. The fourth half bridge 17 is formed of two sensor elements 27 and 28 connected in series. The sensor elements 21 to 28 are all magneto-resistive elements, which change respective impedances in response to the rotating magnetic field generated by rotation of the reference part 87. The first bridge circuit 11 and the second bridge circuit 12 are connected to a first power source Vc1 and a second power sources Vc2, respectively, and form a part of a plurality of bridge circuits. The supply voltages of the first power source Vc1 and the second power sources Vc2 are both 5V.

Figure 4A:
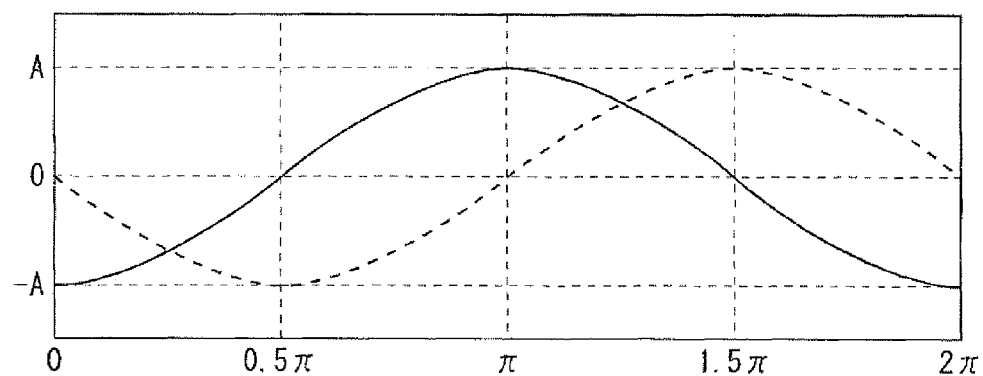
FIGS. 4A and 4B are signal diagrams showing output signals generated from a bridge circuit in the first embodiment.
Figure 4B:
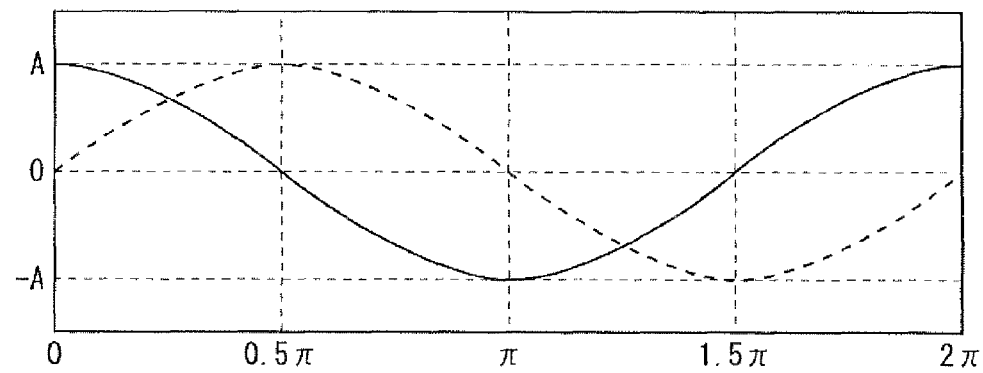

The first half bridge 14 produces, as shown by a solid line in FIG. 4A, a cosine signal of an amplitude A from an intermediate point 31 between the sensor elements 21 and 22. The second half bridge 15 produces, as shown by a broken line in FIG. 4A, a sine signal of an amplitude A from an intermediate point 32 between the sensor elements 23 and 24. The third half bridge 16 produces, as shown by a solid line in FIG. 4B, a cosine signal of an amplitude A from an intermediate point 33 between the sensor elements 25 and 26. The fourth half bridge 17 produces, as shown by a broken line in FIG. 4B, a sine signal of an amplitude A from an intermediate point 34 between the sensor elements 27 and 28. These four output signals are amplified by an amplifier circuit 40.

Figure 5:
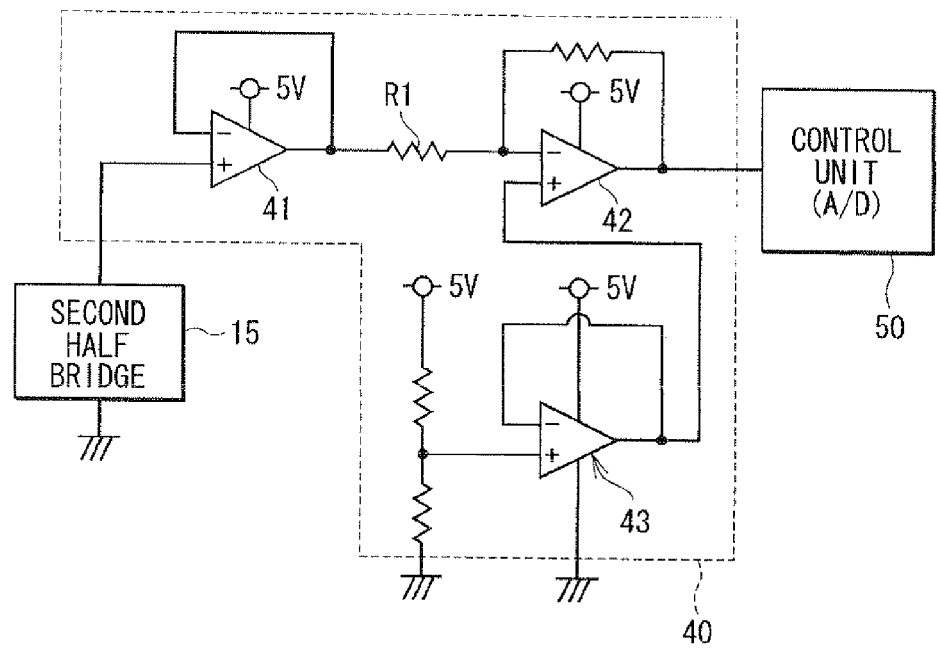
FIG. 5 is a circuit diagram showing an amplifier circuit in the first embodiment.
Figure 6:
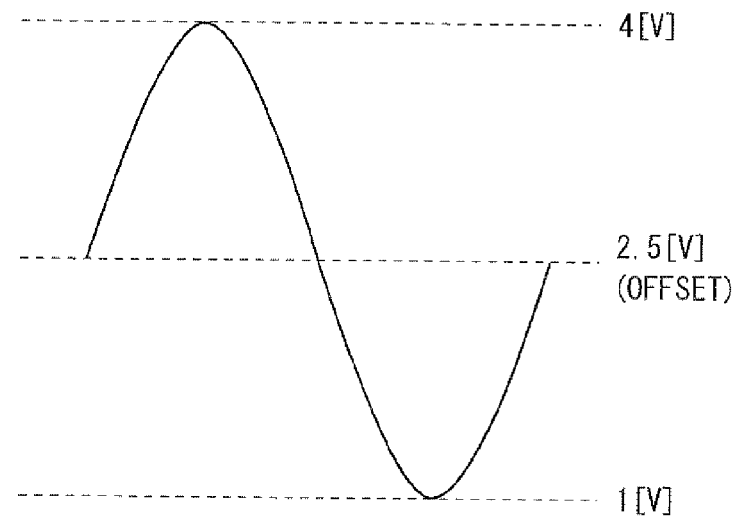
FIG. 6 is a signal diagram showing an output signal amplified by the amplifier circuit in the first embodiment.

The amplifier circuit 40 is configured as shown in FIG. 5, in which only a part for amplifying the output signal produced from the second half bridge 15 is shown exemplarily. Other parts for the other half bridges 14, 16 and 17 are configured in the similar manner. The output signal produced from the intermediate point 32 of the second half bridge 15 is applied to a negative input terminal of an operational amplifier 42 through a buffer 41 and a resistor R1. An offset voltage of 2.5V is produced by an offset part 43 and applied to a positive input terminal of the operational amplifier 42. The output signal produced from the intermediate point 32 of the second half bridge 15 is amplified by the operational amplifier 42 and applied to a control unit 50 as a sine wave signal, which has a center value 2.5V and an amplitude B of 1.5V (FIG. 6). The output signal $-\sin\theta$ of the amplitude A produced from the intermediate point 32 of the second half bridge 15 thus becomes $Vy1=B(\sin\theta)+2.5$ by amplification by the amplifier circuit 40.

Similarly, the output signal $-\cos\theta$ of the amplitude A produced from the intermediate point 31 of the first half bridge 14 thus becomes $Vx1=B(\cos\theta)+2.5$ by amplification by the amplifier circuit 40. The output signal $\cos\theta$ of the amplitude A produced from the intermediate point 33 of the third half bridge 16 thus becomes $Vx2=-B(\cos\theta)+2.5$ by amplification by the amplifier circuit 40. The output signal $\sin\theta$ of the amplitude A produced from the intermediate point 34 of the fourth half bridge 17 thus becomes $Vy2=-B(\sin\theta)+2.5$ by amplification by the amplifier circuit 40. The output signal Vx1 and a signal Vx1a, which is produced by eliminating an offset from Vx1, are both cosine signals. The output signal Vx2 and a signal Vx2a, which is produced by eliminating an offset from Vx2, are both $-$cosine signals. The output signal Vy1 and a signal Vy1a, which is produced by eliminating an offset from Vy1, are both sine signals. The output signal Vy2 and a signal Vy2a, which is produced by eliminating an offset from Vy2, are both $-$sine signals.

Although the amplitude B and the offset are set to 1.5V and 2.5V, respectively, in this embodiment, the amplitude and the offset value may be set to other values by the control unit 50.

The control unit 50 is configured by a microcomputer so that it acquires the four output signals produced from the intermediate points 31 to 34 of the half bridges 14 to 17 and calculates a rotation angle $\theta$ of the reference part 87 based on the acquired output signals. The output signals produced from the intermediate points 31 to 34 of the half bridges 14 to 17 are applied to the control unit 50 after being amplified individually in the amplifier circuit 40. It is noted that the output signals are not subjected to addition or subtraction threreamong before being applied to the control unit 50.

Figure 7:
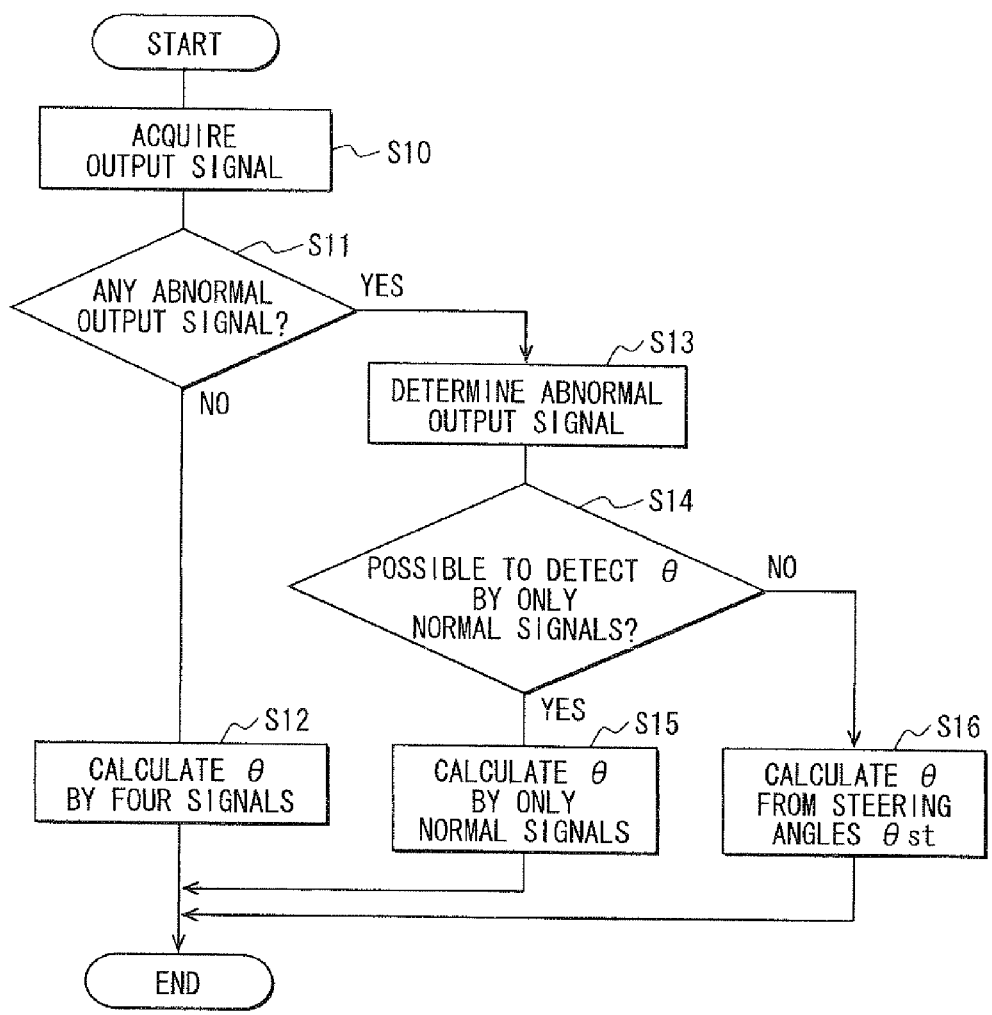
FIG. 7 is a flowchart showing rotation angle calculation processing executed in the first embodiment.

The control unit 50 is configured to perform rotation angle calculation processing as shown in FIG. 7. This rotation angle calculation processing is executed at a predetermined interval in the operation of the EPS, for example, an every 200 μs.

At first step 10 (indicated as S10), the output signals Vx1, Vx2, Vy1 and Vy2 are acquired from the amplifier circuit 40.

At S11, it is checked whether there is any abnormal output signal among the output signals, that is, whether any one of the output signals has abnormality. The abnormality is determined in a manner described below. If there is an abnormal output signal (S11: YES), S13 is executed. If there is no abnormal output signal (S11: NO), S12 is executed.

At S12, the rotation angle θ of the reference part 87 is calculated based on the four output signals produced from the intermediate points 31 to 34 of the four half bridges 14 to 17.

At S13, which is executed if there is the abnormal output signal, it is determined which one of the output signals has abnormality. The abnormal output signal is determined in a manner described later.

At S14, it is checked whether it is possible to calculate the rotation angle θ of the reference part 87 based on remaining normal output signals other than the abnormal output signal. In the first embodiment, the rotation angle θ of the reference part 87 is calculated based on a value of arctangent (arctan). If all sine-system signals (sine signal and −sine signal) or all cosine-system signals (cosine signal and −cosine signal) become abnormal, the rotation angle θ of the reference part 87 cannot be calculated.

If it is possible however to calculate the rotation angle θ of the reference part 87 by only the remaining normal output signals other than the abnormal output signal (S14: YES), S15 is executed. If it is not possible to calculate the rotation angle θ of the reference part 87 by only the remaining normal output signals other than the abnormal output signal (S14: YES), S16 is executed.

At S15, which is executed when the rotation angle θ of the reference part 87 is possibly calculated by only the remaining normal output signals (S14: YES), the rotation angle θ of the reference part 87 is calculated by only the normal output signals without the abnormal output signal.

At S16, which is executed when the rotation angle θ of the reference part 87 is not possibly calculated by only the remaining normal output signals (S14: NO), the rotation angle θ of the reference part 87 is calculated based on a steering angle θst detected by the steering sensor 94. The steering angle θst detected by the steering sensor 94 is an external signal.

The control unit 50 operates as a signal acquisition section, an abnormality determination section and a rotation angle calculation section. S10 is a section, which performs signal acquisition processing. S13 is a section, which performs abnormal signal determination processing. S12, S15 and S16 are a section, which performs rotation angle calculation processing.

The rotation angle θ of the reference part 87 is calculated as follows.

The rotation angle θ is calculated as follows at S16. If it is impossible to calculate the rotation angle θ of the reference part 87 by the output signals other than the abnormal signal, which is an output signal having abnormality, (S14: NO), that is, all the sine-system signals or all the cosine-system signals become abnormal, the rotation angle θ is calculated as follows. Here, θst, θmech, Pn and G indicate, respectively, the steering angle detected by the steering sensor 94, a mechanical angle of the motor 80, the number of pole pairs of the motor 80, and the reduction ratio.

$$\theta mech=(1/Pn)\theta \quad (1)$$

$$\theta st=(1/G)\theta mech \quad (2)$$

By substituting the equation (1) into the equation (2), the following equation (3) is obtained.

$$\theta=(G)(Pn)(\theta st) \quad (3)$$

The rotation angle θ is calculated at S12 as follows. If all the output signals Vx1, Vx2, Vy1 and Vy2 have no abnormality, respective offset values are cancelled out by subtraction between the sine-system signals or by subtraction between the cosine-system signals (S12). It is noted that, by subtracting the two signals, not only the offset values but also error due to temperature characteristics are eliminated (cancelled out).

$$Vx1-Vx2=2B(\cos\theta) \quad (4)$$

$$Vy1-Vy2=2B(\sin\theta) \quad (5)$$

The rotation angle θ of the reference part 87 calculated by an angle φ, which is an arctangent calculated by using the equations (4) and (5). The rotation angle θ of the reference part 87 is calculated from the angle φ as will be described below with reference to FIGS. 8 and 9.

$$\phi=\arctan\{(Vy1-Vy2)/(Vx1-Vx2)\} \quad (6)$$

$$\phi=\arctan\{(Vx1-Vx2)/(Vy1Vy2)\} \quad (7)$$

The rotation angle θ is calculated at S15 as follows. It is assumed here that one output signal (for example, Vx1=B cos θ+2.5) has abnormality and is an abnormal signal. The rotation angle is calculated similarly when the other output signal is abnormal. When all the output signals Vx1, Vx2, Vy1 and Vy2 have no abnormalities, the offset values can be eliminated by performing subtraction between the sine-system signals and between the cosine-system signals as described above. When the output signal Vx1 has abnormality, the offset value cannot be cancelled out by subtracting the cosine-system signals. Therefore, the offset value of the output signal Vx2 (=−B cos θ+2.5), which has no abnormality, is cancelled out by the control unit 50.

$$Vx2a=Vx2-2.5=-B(\cos\theta)-2Vx2a=2B(\cos\theta) \quad (8)$$

The rotation angle θ is calculated based on the angle φ, which is the arctan calculated by uing the equations (5) and (8).

$$\phi=\arctan\{(Vy1-Vy2)/(-2Vx2a)\} \quad (9)$$

$$\phi=\arctan\{(-2Vx2a)/(Vy1-Vy2)\} \quad (10)$$

The rotation angle θ of the reference part 87 is calculated from the angle φ, which is the arctan calculated based on the sine-system signals and the cosine-system signals, as shown in FIGS. 8A, 8B and 9. FIG. 8A shows eight divisions (areas 1 to 8) of the ranges of the rotation angle θ of the shaft 83, which is viewed from the rotation angle detection device 10. FIG. 8B shows the sine signal and the cosine signal. FIG. 9 shows a method of calculating the rotation angle θ from the angle φ. The sine signal and the cosine signal are indicated as Vy and Vx, respectively.

First, if the amplitudes of the sine signal and the cosine signal used for the angle calculation are different from each other, the amplitudes are adjusted to the same amplitude (for example, refer to equation (8)). Further, if the sine signal and the cosine signal are negative (−), the signals are converted to positive signals by multiplying by −1 (for example, refer to equation (8)).

As indicated by the equations (6), (7), (9) and (10), the angle φ is calculated as a tangent value or the arctangent value. The tangent value is calculated by dividing the sine signal by the cosine signal (tan θ=sin θ/cos θ). The arctangent signal is calculated by dividing the cosine signal by the sine signal (cot θ=cos θ/sin θ). Since the sine signal and the cosine signal become zero at certain angles, division by zero need be avoided. For this reason, the angle φ is calculated based on the tangent signal in the angular range including an angle, at which sin θ becomes zero. The angle φ is calculated based on the cotangent signal in the angular range including an angle, at which cos θ becomes zero.

Assuming that the rotation angle θ is 0° to 360°, the tangent value and the cotangent value take the same value at different angles θ. Therefore, the rotation angle is calculated based on the arctangent of the tangent value or the cotangent value by specifying the range of the rotation angle θ based on the relation between magnitudes of the absolute values of the sine signal and the cosine signal or signs of the sine signal and the cosine signal.

Specifically, as shown in FIGS. 8A, 8B and 9, it is determined to which one of the eight angular ranges 1 to 8 in 0° to 360° the rotation angle θ belongs, based on the relation between the magnitudes of the sine signal and the cosine signal having adjusted amplitude and signs of the sine signal and the cosine signal. Either the tangent value or the cotangent value is used so that the larger one of the absolute values are used as a denominator by comparing the absolute values of the sine signal and the cosine signal. The angle φ, which is the arctangent of the tangent value or the cotangent value, is thus calculated. Since the rotation angle θ is divided into the eight areas 1 to 8, the rotation angle θ is calculated by adding or subtracting the calculated angle φ to or from the reference angle 0° (360), 90°, 180° or 270° as shown in FIG. 9.

The abnormal signal of the output signals is determined as follows. The abnormality output signal is specified by using the four output signals Vx1, Vx2, Vy1 and Vy2 applied to the control unit 50. The offset values of the four output signals Vx1, Vx2, Vy1 and Vy2 are eliminated in the control unit 50 to calculate Vx1$a$, Vx2$a$, Vy1$a$ and Vy2$a$ as follows.

$$Vx1a = Vx1 - 2.5 = B(\cos\theta)$$

$$Vx2a = Vx2 - 2.5 = -B(\cos\theta)$$

$$Vy1a = Vy1 - 2.5 = B(\sin\theta)$$

$$Vy2a = Vy2 - 2.5 = -B(\sin\theta)$$

Square values of Vx1$a$, Vx2$a$, Vy1$a$ and Vy2$a$ are calculated as first values Vx1$a^2$, Vx2$a^2$, Vy1$a^2$ and Vy2$a^2$. Two of the first values are combined to calculate, as second values, a sum of the square value of the sine-system signal and the square value of the cosine-system signal. Specifically, the second values are calculated by the following equations (11) to (14).

$$Vx1a^2 + Vy1a^2 = B^2\cos^2\theta + B^2\sin^2\theta = B^2(\sin^2\theta + \cos^2\theta) \quad (11)$$

$$Vx1a^2 + Vy2a^2 = B^2\cos^2\theta + B^2\sin^2\theta = B^2(\sin^2\theta + \cos^2\theta) \quad (12)$$

$$Vx2a^2 + Vy1a^2 = B^2\cos^2\theta + B^2\sin^2\theta = B^2(\sin^2\theta + \cos^2\theta) \quad (13)$$

$$Vx2a^2 + Vy2a^2 = B^2\cos^2\theta + B^2\sin^2\theta = B^2(\sin^2\theta + \cos^2\theta) \quad (14)$$

If the four output signals Vx1, Vx2, Vy1, Vy2 are normal, all the second values theoretically equal $B^2$ because $\sin^2\theta + \cos^2\theta = 1$. Therefore, as shown in FIG. 10, it is possible to determined which one of the output signals is abnormal based on a combination of the second values, which deviate from a predetermined range having a center value $B^2$. The width of the predetermined range may be set appropriately in accordance with gain or measurement error caused depending on the temperature characteristics of the sensor elements 21 to 28. The predetermined range having the center value $B^2$ corresponds to a first range, and $B^2$ corresponds to a constant K.

In FIG. 10, the second values deviate from the predetermined range from the center value $B^2$ in situations indicated by a circle (○). The rotation angle θ of the reference part 87, which is determined by the abnormal output signal specified in FIG. 10, is calculated as shown in FIG. 11.

As shown in FIG. 10, the output signal Vx1 is determined to be abnormal if the second values calculated by the equations (11) and (12) are outside the predetermined range from the center value $B^2$. The rotation angle θ is calculated by using the output signals Vx2, Vy1 and Vy2 other than the abnormal output signal Vx1 as shown in FIG. 11 (Mode Ma).

The output signal Vx2 is determined to be abnormal if the second values calculated by the equations (13) and (14) are outside the predetermined range from the center value $B^2$. The rotation angle θ is calculated by using the output signals Vx1, Vy1 and Vy2 other than the abnormal output signal Vx2 as shown in FIG. 11 (Mode Mb).

The output signal Vy1 is determined to be abnormal if the second values calculated by the equations (11) and (13) are outside the predetermined range from the center value $B^2$. The rotation angle θ is calculated by using the output signals Vx1, Vx2 and Vy2 other than the abnormal output signal Vy1 as shown in FIG. 11 (Mode Mc).

The output signal Vy2 is determined to be abnormal if the second values calculated by the equations (12) and (14) are outside the predetermined range from the center value $B^2$. The rotation angle θ is calculated by using the output signals Vx1, Vx2 and Vy1 other than the abnormal output signal Vy2 as shown in FIG. 11 (Mode Md).

The output signals Vx1 and Vy1 are determined to be abnormal if the second values calculated by the three equations other than the equation (14) are outside the predetermined range from the center value $B^2$. The rotation angle θ is calculated by using the output signals Vx2 and Vy2 other than the abnormal output signals Vx1 and Vy1 as shown in FIG. 11 (Mode Me).

The output signals Vx1 and Vy2 are determined to be abnormal if the second values calculated by the three equations other than the equation (13) are outside the predetermined range from the center value $B^2$. The rotation angle θ is calculated by using the output signals Vx2 and Vy1 other than the abnormal output signals Vx1 and Vy2 as shown in FIG. 11 (Mode Mf).

The output signals Vx2 and Vy1 are determined to be abnormal if the second values calculated by the three equations other than the equation (12) are outside the predetermined range from the center value $B^2$. The rotation angle θ is calculated by using the output signals Vx1 and Vy2 other than the abnormal output signals Vx2 and Vy1 as shown in FIG. 11 (Mode Mg).

The output signals Vx2 and Vy2 are determined to be abnormal if the second values calculated by the three equations other than the equation (11) are outside the predetermined range from the center value $B^2$. The rotation angle θ is calculated by using the output signals Vx1 and Vy1 other than the abnormal output signals Vx2 and Vy2 as shown in FIG. 11 (Mode Mh).

All the sine-system signals (Vy1 and Vy2) or all the cosine-system signals (Vx1 and Vx2) are determined to be abnormal if all the second values calculated by the equations (11) to (14) are outside the predetermined range from the center value $B^2$. Since the arctangent value cannot be calculated in this case, the rotation angle θ is calculated by using the steering angle θst (Mode Mi and Mj).

The modes Ma to Mh correspond to S15 in FIG. 7. The modes Mi and Mj correspond to S16 in FIG. 3.

One example (Mode Ma) is described with an assumption that Vx1 becomes abnormal and B cos θ=5V. The amplitude B in this case is 5V as described above. The output signal acquired by the control unit 50 is expressed by the following equation.

$$Vx1=5+2.5=7.5 \qquad (15)$$

If the offset value of the equation (15) is eliminated by the control unit 50, Vx1a is expressed as Vx1a=5.

If the second values are calculated by the equations (11) to (14), the second values calculated by the equations (13) and (14) become $B^2$=2.25. However, the second values calculated by the equations (11) and (12) vary between 25 and 27.5, which is different from $B^2$. Based on that the second values calculated by the equations (11) and (12) do not equal $B^2$, the output signal Vx1 is determined to be abnormal.

It is assumed next that another output signal becomes abnormal in addition to one abnormal signal (Mode Ma to Md). This case is described with reference to an exemplary case shown in FIG. 12A, in which an output signal other than the output signal Vx1 becomes abnormal in addition to the abnormality of the output signal Vx1 (Mode Ma).

Since the output signal Vx1 is abnormal, the second values calculated by the equations (11) and (12) are outside the predetermined range from the center value $B^2$ as understood in FIG. 10. If the second values calculated by the equations (13) and (14) also become outside the predetermined range from the center value $B^2$ as shown in FIG. 12A, the output signal Vx2 is determined to be abnormal in addition to the output signal Vx1. Since all the cosine-system signals are abnormal and the arctangent values cannot be calculated in this case, the rotation angle θ is calculated by using the steering angle θst (Mode Mi, Mj).

If the second value calculated by the equation (13) becomes also outside the predetermined range from the center value $B^2$ in addition to the second values calculated by the equations (11) and (12), the output signal Vy1 is determined to be abnormal in addition to the output signal Vx1. The rotation angle θ is calculated by using the output signals Vx2 and Vy2 other than the abnormal output signals Vx1 and Vy1 (Mode Me).

If the second value calculated by the equation (14) also becomes outside the predetermined range from the center value $B^2$ in addition to the second values calculated by the equations (11) and (12), the output signal Vy2 is determined to be abnormal in addition to the output signal Vx1. The rotation angle θ is calculated by using the output signals Vx2 and Vy1 other than the abnormal output signals Vx1 and Vy2 (Mode Mf).

It is assumed further that still one more output signal becomes abnormal in a case (Mode Me, Mf), in which the output signal Vy1 or Vy2 is abnormal in addition to the output signal Vx1.

If the second value calculated by the equation (13) becomes outside the predetermined range from the center value $B^2$ and further the second calculation calculated by the equation (14) becomes outside the predetermined range from the center value $B^2$, in addition to the second values calculated by the equations (11) and (12), as shown in FIG. 12B, the output signal Vx2 or Vy2 is determined to be abnormal in addition to the output signals Vx1 and Vy1. Since all the sine-system signals (Vy1 and Vy2) or all the cosine-system signals (Vx1 and Vx2) are abnormal and hence the arctangent values cannot be calculated, the rotation angle θ is calculated by using the steering angle θst.

If the second value calculated by the equation (14) becomes outside the predetermined range from the center value $B^2$ and further the second calculation calculated by the equation (13) becomes outside the predetermined range from the center value $B^2$, in addition to the second values calculated by the equations (11) and (12), the output signal Vx2 or Vy1 is determined to be abnormal in addition to the output signals Vx1 and Vy2. Since all the sine-system signals (Vy1 and Vy2) or all the cosine-system signals (Vx1 and Vx2) are abnormal and hence the arctangent value cannot be calculated, the rotation angle θ is calculated by using the steering angle θst (Mode Mi, Mj).

In the example of FIGS. 12A and 12B, it is assumed that the output signal Vx1 has become abnormal first. Even if any other output signal becomes abnormal first, the rotation angle θ is calculated based on the other normal output signals having no abnormality or the steering angle θst by determining which one of the output signals has become abnormal in the similar manner.

As described above, the rotation angle detection device 10 according to the first embodiment is used for the electric power steering system 1. The signal acquisition section in the control unit 50 acquires the output signals developed at the intermediate points 31 to 34 of the half bridges 14 to 17 one by one without processing of addition and processing of differential amplification among the output signals. The signal acquisition section acquires the four output signals developed at the intermediate points 31 to 34 of the four half bridges 14 to 17. The rotation angle calculation section calculates the rotation angle θ of the reference part 87 based on the acquired four output signals.

The abnormality determination section in the control unit 50 determines the output signal to be abnormal, if the calculation value calculated by using such output signals is outside the predetermined range. According to the first embodiment, the abnormality of an output signal is determined based on the calculation value calculated based on the output signals acquired from half bridges. As a result, it is possible to determine which one of the output signals has become abnormal because of failure or the like. It is also possible not to detect the rotation angle erroneously. The rotation angle detection section can detect rotation angles of a multiple systems even when a part of the systems fails. Since it is possible to determine which output signal is abnormal, cause of failure or part of failure can be determined readily.

The four output signals applied to the control unit 50 are normally the sine signal, –sine signal, cosine signal and –cosine signal of the amplitude B=1.5. Specifically, the output signal Vx1 applied to the control unit 50 from the intermediate point 31 of the first half bridge 13 is B cos θ+2.5. The output signal Vy1 applied to the control unit 50 from the intermediate point 32 of the second half bridge 15 is B sin θ+2.5. The output signal Vx2 applied to the control unit 50 from the intermediate point 33 of the third half bridge 16 is –B cos θ+2.5. The output signal Vy2 applied to the control unit 50 from the intermediate point 34 of the fourth half bridge 16 is –B sin θ+2.5.

According to the first embodiment, the control unit 50 calculates the output signals Vx1a, Vx2a, Vy1a and Vy2a from the output signals Vx1, Vx2, Vy1 and Vy2 by eliminating the offset value, respectively. The control unit 50 calculates the first values Vx1$a^2$, Vx2$a^2$, Vy1$a^2$ and Vy2$a^2$. As indicated by the equations (11) to (14), the second values are calculated by using at least once each of the four first values. Specifically, the second values are calculated by the equations (11) to (14) by adding one of Vx1a2 and Vx2a2, which are square values of the cosine-system signals, and one of Vy1$a^2$ and Vy2$a^2$, which are square values of the sine-system signals. The abnormal one of the output signals is determined based on the combination of the second values, which are outside the predetermined range from the center value $B^2$, among the second values calculated by the equations (11) to (14). Since the second values calculated by the equations (11) to (14) are all $B^2(\sin^2 \theta + \cos^2 \theta)$, the second values are theoretically constant $B^2$ if the output signals are normal. Thus, the abnormality of the output signal can be determined readily by simple calculation.

Further, in case that it is possible to calculate the rotation angle $\theta$ of the reference part 87 based on the normal output signals other than the abnormal output signal (S14: YES), that is, in case that at least one of the sine-system signals and at least one of the cosine-system signals are normal, the rotation angle $\theta$ of the reference part 87 is calculated based on the output signals (S15), which are not abnormal. According to the first embodiment, it is determined which one of the output signals is abnormal. It is possible to continue to calculate the rotation angle $\theta$ based on the output signals other than the abnormal one. Thus, it is not only possible to continue the steering assist operation by the electric power steering system 1 but also to suppress degradation of steering operation.

In case that it is not possible to calculate the rotation angle $\theta$ of the reference part 87 based on the normal output signals other than the abnormal output signal (S14: NO), it is possible to continue calculation of the rotation angle $\theta$ by calculating the rotation angle $\theta$ of the reference part 87 based on the steering angle $\theta$st detected by the steering sensor 94 (S16), in case that all the sine-system signals or all the signals in the cosine-system signals become abnormal. According to the first embodiment, the rotation angle detection device 10 is used in the electric power steering system 1. As a result, it is possible to continue to drive the electric power steering system 1 and suppress the degradation of the steering operation by calculating the rotation angle $\theta$ based on the steering angle $\theta$st detected by the steering sensor 94. The predetermined range having the center value $B^2$ corresponds to a first range, and $B^2$ corresponds to K.

Further, the output signal Vx1 produced from the intermediate point 31 of the half bridge 14 of the first bridge circuit 11 through the amplifier circuit 40 is the cosine signal. The output signal Vy1 produced from the intermediate point 32 of the half bridge 15 through the amplifier circuit 40 is the sine signal. The output signal Vx2 produced from the intermediate point 33 of the half bridge 16 of the second bridge circuit 12 through the amplifier circuit 40 is the –cosine signal and the output signal Vy2 produced from the intermediate point 34 of the half bridge 17 through the amplifier circuit 40 is the –sine signal. The first bridge circuit 11 and the second bridge circuit 12 are connected to different electric power sources, respectively. As a result, even if one of the bridge circuits or one of the power sources fails, the rotation angle $\theta$ of the reference part 87 can be calculated by using the sine-system signal and the cosine-system signal produced from the other bridge circuit.

Second Embodiment

The abnormality of an output signal is determined as follows according to the second embodiment. The following description is made only with respect to different parts from the first embodiment. The rotation angle $\theta$ is calculated in the same manner as in the first embodiment.

Figure 13:
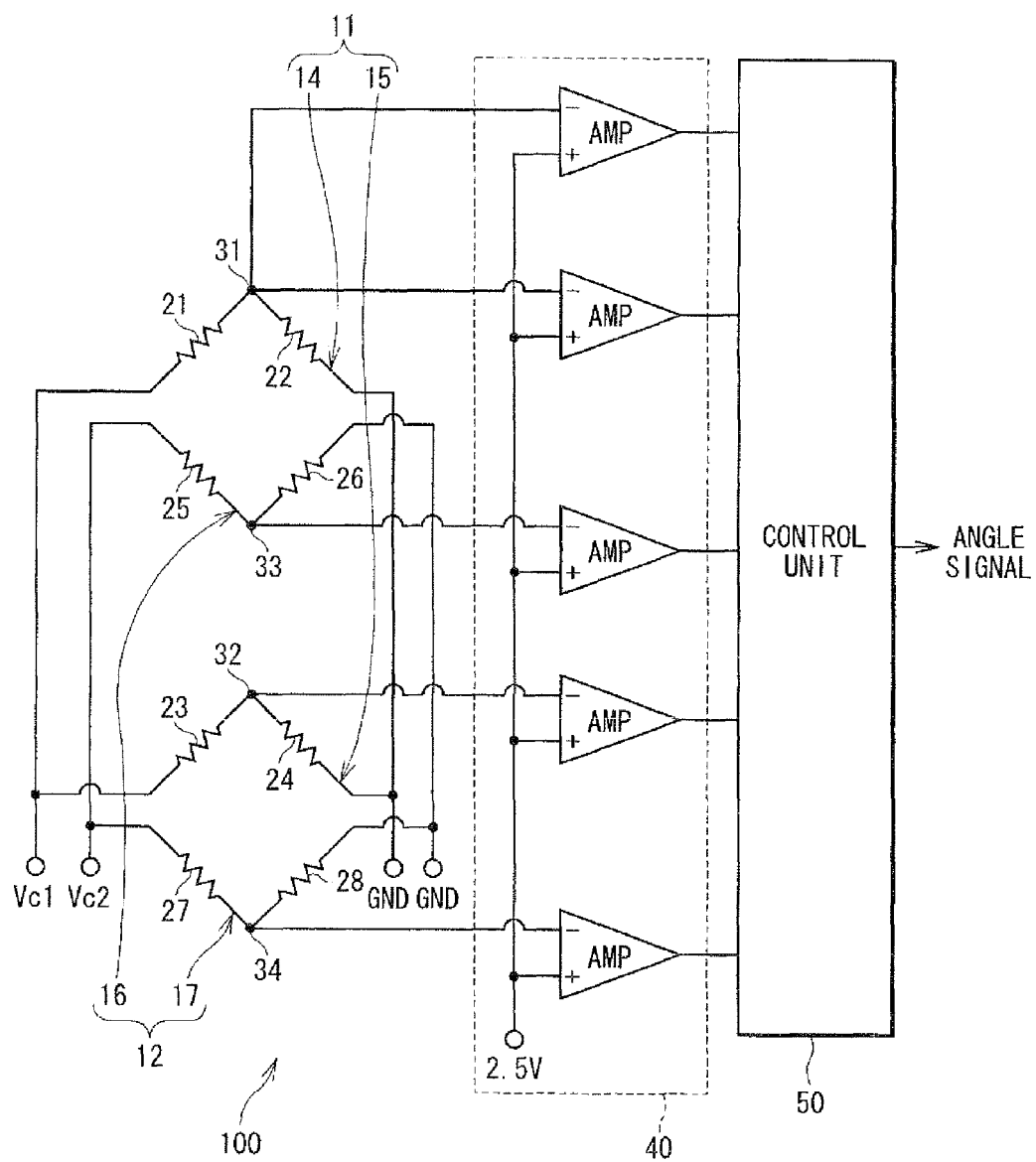
FIG. 13 is a circuit diagram showing a rotation angle detection device according to a second embodiment of the present invention.

As shown in FIG. 13, a rotation angle detection device 100 according to the second embodiment is different from that of the first embodiment in that two output signals are produced from the intermediate point 31 of the first half bridge 14.

The output signals produced from the intermediate point 31 of the first half bridge 14 are both –cosine signals of the amplitude A and amplified by the amplifier circuit 40. As a result, the output signal applied to the control unit 50 is expressed as Vx11=B(cos $\theta$)+2.5 and Vx12=B(cos $\theta$)+2.5. The output signal produced from the intermediate point 33 of the third half bridge 16 is amplified by the amplifier circuit 40. As a result, the output signal is expressed as Vx13=–B(cos $\theta$)+2.5. The output signal produced from the intermediate point 32 of the second half bridge 15 is amplified by the amplifier circuit 40. As a result, the output signal is expressed as Vy11=B(sin $\theta$)+2.5. The output signal sine produced from the intermediate point 34 of the fourth half bridge 17 is amplified by the amplifier section 40. As a result, the output signal is expressed as Vy12=–B(sin $\theta$)+2.5. The control unit 50 thus receives the five output signals Vx11, Vx12, Vx13, Vy11 and Vy12. The output signals Vx11 and Vx12 are both cosine signals. The output signals Vx11a and Vx12a, which are produced by canceling out the offsets from the output signals Vx11 and Vx12, are also both cosine signals. The output signal Vx13 is the –cosine signal. The signal Vx13a, which is produced by canceling out the offset from the output signal Vx13, is also the –cosine signal. The output signal Vy11 is the sine signal. The output signal Vy11a, which is produced by canceling out the offset from the output signal Vy11, is also the sine signal. The output signal Vy12 is the –sine signal. The signal Vy12a, which is produced by canceling out the offset from the output signal Vy12, is also the –sine signal.

The circuit configuration is the same as in the first embodiment except that two signals are produced from the intermediate point 31 of the first half bridge 14.

The abnormality determination section in the control unit 50 determines the abnormality of the output signal, that is, which one of the output signals is abnormal, by calculating five output signals Vx11, Vx12, Vx13, Vy1 and Vy12 applied to the control unit 50.

The offset values of the five output signals Vx11, Vx12, Vx13, Vy11 and Vy12 are eliminated in the control unit 50 to calculate Vx11a, Vx12a, Vx13a, Vy11a and Vy12a as follows.

$$Vx11a = Vx11 - 2.5 = B(\cos \theta)$$

$$Vx12a = Vx12 - 2.5 = B(\cos \theta)$$

$$Vx13a = Vx13 - 2.5 = -B(\cos \theta)$$

$$Vy11a = Vy11 - 2.5 = B(\sin \theta)$$

$$Vy12a = Vy12 - 2.5 = -B(\sin \theta)$$

Square values of Vx11a, Vx12a, Vx13a, Vy11a and Vy12a are calculated as the first values Vx11$a^2$, Vx12$a^2$, Vx13$a^2$, Vy11$a^2$ and Vy12$a^2$. Two of the first values are combined to calculate, as a second value, a sum of the square values of the sine-system signal and the square value of the cosine-system signal. Specifically, the second values are calculated by the following equations (21) to (24).

$$Vx11a^2 + Vy11a^2 = B^2 \cos^2 \theta + B^2 \sin^2 \theta = B^2(\sin^2 \theta + \cos^2 \theta) \quad (21)$$

$$Vx11a^2 + Vy12a^2 = B^2 \cos^2 \theta + B^2 \sin^2 \theta = B^2(\sin^2 \theta + \cos^2 \theta) \quad (22)$$

$$Vx12a^2 + Vy11a^2 = B^2 \cos^2 \theta + B^2 \sin^2 \theta = B^2(\sin^2 \theta + \cos^2 \theta) \quad (23)$$

$$Vx13a^2 + Vy12a^2 = B^2 \cos^2 \theta + B^2 \sin^2 \theta = B^2(\sin^2 \theta + \cos^2 \theta) \quad (24)$$

If the five output signals Vx11, Vx12, Vx13, Vy11, Vy12 are normal, all the second values theoretically equal $B^2$ because $\sin^2 \theta + \cos^2 \theta = 1$. Therefore, as shown in FIG. 14, it is possible to determine which one of the output signals is abnormal based on a combination of the second values, which deviates from a predetermined range having its center value at $B^2$. The width of the predetermined range may be set appropriately in accordance with gain or measurement error caused depending on the temperature characteristics of the sensor elements. The predetermined range having the center value $B^2$ corresponds to the first range and $B^2$ corresponds to K.

In FIG. 14, a relation between a combination of the second values deviating from the predetermined range from the center value $B^2$ and the abnormality of the output signal. In FIG. 14, the situations, in which the second value deviates from the predetermined range from the center value $B^2$ are indicated by a circle (○).

As shown in FIG. 14, the output signal Vx11 is determined to be abnormal, if the second values calculated by the equations (21) and (22) are outside the predetermined range from the center value $B^2$. The rotation angle θ is calculated by using the remaining output signals Vx12, Vx13, Vy11 and Vy12 other than the abnormal output signal Vx11. Since the output signals Vx12 and Vx13 are normal in this case, the offset values and the error caused by the temperature characteristics can be eliminated by subtraction between Vx12 and Vx13 as expressed by the equation (4).

The output signal Vx12 is determined to be abnormal, if the second value calculated by the equation (23) is outside the predetermined range from the center value $B^2$. The rotation angle θ is calculated by using the output signals Vx11, Vx13, Vy11 and Vy12 other than the abnormal output signal Vx12. Since the output signals Vx11 and Vx13 are normal in this case, the offset values and the error caused by the temperature characteristics can be eliminated by subtraction between Vx11 and Vx13 as expressed by the equation (4).

The output signal Vx13 is determined to be abnormal, if the second value calculated by the equation (24) is outside the predetermined range from the center value $B^2$. The rotation angle θ is calculated by using the output signals Vx11 or Vx12, Vy11 and Vy12 other than the abnormal output signal Vx13.

The output signal Vy11 is determined to be abnormal, if the second values calculated by the equations (21) and (23) are outside the predetermined range from the center value $B^2$. The rotation angle θ is calculated by using the output signals Vx11 or Vx12, Vy11 and Vy12 other than the abnormal output signal Vx13.

The output signal Vy12 is determined to be abnormal, if the second values calculated by the equations (22) and (24) are outside the predetermined range from the center value $B^2$. The rotation angle θ is calculated by using the output signals Vx11 or Vx12, Vx13 and Vy11 other than the abnormal output signal Vy12.

In case that the five output signals are applied to the control unit 50, the abnormal signal can be determined by performing the four calculations if the abnormal signal is only one. Similarly, in case that four to eight output signals are applied to the control unit 50 and the number of abnormal signal is one, the abnormal signal can be determined by performing the four calculations. Further, even in case that a plurality of output signals become abnormal concurrently, the abnormal signals can be determined by calculation of combinations of the sine-system signals and the cosine-system signals. The number of the combinations of the sine-system signals and the cosine-system signals is six in the second embodiment.

In addition to the foregoing advantages provided by the first embodiment, the reliability of the rotation angle detection device 100 according to the second embodiment is improved by increase in number of the output signals acquired by the control unit 50.

Third Embodiment

According to the third embodiment, the rotation angle detection device is configured in the similar manner as in the first embodiment and four output signals are applied to the control unit 50 as in the first embodiment.

The abnormality determination section in the control unit 50 determines the abnormal signal among the output signals by calculating the four output signals applied to the control unit 50. The output signals are Vx1=B(cos θ)+2.5, Vx2=−B(cos θ)+2.5, Vy1=B(sin θ)+2.5 and Vy2=−B sin θ+2.5.

First, subtraction values Vx1y1, Vx1y2, Vx2y1 and Vx2y2 are calculated by subtraction between the sine-system signals and the cosine-system signals among the four output signals. Thus, not only the offset value but also the error caused by the temperature characteristics can be eliminated.

$$Vx1y1 = Vx1 - Vy1 = B(\cos \theta) - B(\sin \theta)$$

$$Vx1y2 = Vx1 - Vy2 = B(\cos \theta) + B(\sin \theta)$$

$$Vx2y1 = Vx2 - Vy1 = -B(\cos \theta) - B(\sin \theta)$$

$$Vx2y2 = Vx2 - Vy2 = -B(\cos \theta) + B(\sin \theta)$$

The square values of the subtraction values Vx1y1, Vx1y2, Vx2y1 and Vx2y2 are calculated. Two of the first values are combined to calculate, as the second values, a sum of two square values, which corresponds to $K(\sin^2 \theta + \cos^2 \theta)$ with K being a constant. Specifically, the second values are calculated by the following equations (31) to (34).

$$Vx1y1^2 + Vx1y2^2 = 2B^2(\sin^2 \theta + \cos^2 \theta) \quad (31)$$

$$Vx2y1^2 + Vx2y2^2 = 2B^2(\sin^2 \theta + \cos^2 \theta) \quad (32)$$

$$Vx1y1^2 + Vx2y1^2 = 2B^2(\sin^2 \theta + \cos^2 \theta) \quad (33)$$

$$Vx1y2^2 + Vx2y2^2 = 2B^2(\sin^2 \theta + \cos^2 \theta) \quad (34)$$

If the four output signals Vx1, Vx2, Vy1, Vy2 are normal, all the second values are theoretically $2B^2$ because $\sin^2 \theta + \cos^2 \theta = 1$. Therefore, as shown in FIG. 15, it is possible to determined which one of the output signals is abnormal based on a combination of the second values, which deviates from a predetermined range having its center value $2B^2$. The width of the predetermined range may be set appropriately in accordance with gain or measurement error caused depending on the temperature characteristics of the sensor elements. The predetermined range having the center value $2B^2$ corresponds to the first range and $2B^2$ corresponds to K.

In FIG. 15, a relation between a combination of the second values deviating from the predetermined range from the center value $2B^2$ and abnormality of the output signal. In FIG. 15, the situations, in which the second value deviates from the predetermined range having its center at $213^2$ are indicated by a circle (○). The rotation angle θ of the reference part 87 is calculated as shown in FIG. 16, in case of determination of the abnormal signal shown in FIG. 15.

As shown in FIG. 15, the output signal Vx1 is determined to be abnormal, if the second values calculated by the equations (31), (33) and (34) are outside the predetermined range from its center value $2B^2$. The rotation angle θ is calculated by using the output signals Vx2, Vy1 and Vy2 other than the abnormal output signal Vx1 as shown in FIG. 16 (Mode Ma).

The output signal Vx2 is determined to be abnormal, if the second values calculated by the equations (32), (33) and (34)

are outside the predetermined range from its center value $2B^2$. The rotation angle θ is calculated by using the output signals Vx1, Vy1 and Vy2 other than the abnormal output signal Vx2 as shown in FIG. 16 (Mode Mb).

The output signal Vy1 is determined to be abnormal, if the second values calculated by the equations (31), (32) and (33) are outside the predetermined range from its center value $2B^2$. The rotation angle θ is calculated by using the output signals Vx1, Vx2 and Vy2 other than the abnormal output signal Vy1 as shown in FIG. 16 (Mode Mc).

The output signal Vy2 is determined to be abnormal, if the second values calculated by the equations (31), (32) and (34) are outside the predetermined range from its center value $2B^2$. The rotation angle θ is calculated by using the output signals Vx1, Vx2 and Vy1 other than the abnormal output signal Vy2 as shown in FIG. 16 (Mode Md).

The rotation angle θ may be calculated by using the steering angle θst in the similar manner as in the first embodiment, if all the calculated second values calculated by the equations (31) to (34) are outside the predetermined range.

According to the third embodiment, the abnormality determination section in the control unit 50 calculates the first values Vx1y1, Vx1y2, Vx2y1 and Vx2y2, which are calculated by subtraction between two output signals among four output signals. Since the subtraction value is calculated by subtraction between combinations of the sine-system signals and the cosine-system signals, errors caused by temperature characteristics of the sensor elements can be eliminated. Further, each of the four first values is used at least once to calculate the four second values by adding two of the first values. The abnormality of each output signal is determined based on a combination of the second values, which are calculated by the equations (31) to (34) and outside a predetermined range from its center value $2B^2$. Since each of the equations (31) to (34) is $2B^2(\sin^2 θ + \cos^2 θ)$, the second value is constant $2B^2$ theoretically if the output signal has no abnormality. Thus, the abnormality of the output signal can be determined by simple calculation.

Since the abnormality of the output signal is determined by the abnormality determination section in the control unit 50, the similar advantage is provided as in the first embodiment.

Fourth Embodiment

According to the fourth embodiment, the rotation angle detection device is configured in the similar manner as in the first embodiment.

The abnormality determination section in the control unit 50 determines the abnormality of the output signal by calculating the four output signals applied to the control unit 50. The four output signals are Vx1=B(cos θ)+2.5, Vx2=−B(cos θ)+2.5, Vy1=B(sin θ)+2.5 and Vy2=−B sin θ+2.5.

First, a cosine signal calculation value is calculated by adding the output signals Vx1 and Vx2 by the following equation (35), and a sine signal calculation value is calculated by adding the output signals Vy1 and Vy2 by the following equation (36).

$$Vx1+Vx2=B(\cos θ)−B(\cos θ)+5 \quad (35)$$

$$Vx1+Vy2=B(\sin θ)−B(\sin θ)+5 \quad (36)$$

The output signals Vx1 and Vx2 are different from each other by 180° in phase. As long as the output signals Vx1 and Vx2 are normal, the cosine signal calculation value is a fixed value P1, specifically 5 in this embodiment. If the cosine signal calculation value is outside the predetermined range having the center value P1, it is readily determined that abnormality is present in a cosine-system signal.

Similarly, the output signals Vy1 and Vy2 are different from each other by 180° in phase. As long as the output signals Vy1 and Vy2 are normal, the sine signal calculation value is a fixed value P1, specifically 5 in this embodiment. If the sine signal calculation value is outside the predetermined range having the center value P1, it is readily determined that abnormality is present in a cosine-system signal.

The width of the predetermined range may be set appropriately in accordance with gain or measurement error caused depending on the temperature characteristics of the sensor elements. The predetermined range having the center value P1 corresponds to a third range and the predetermined range having the center value P2 corresponds to a second range. Since it is not possible to determine which one of the sine-system signals has abnormality or which one of the cosine-system signals has abnormality, check result at S14 in FIG. 7 is necessarily NO.

The present invention is not limited to the disclosed embodiments but may be implemented in other various embodiments.

(A) Circuit Configuration

Figure 17:
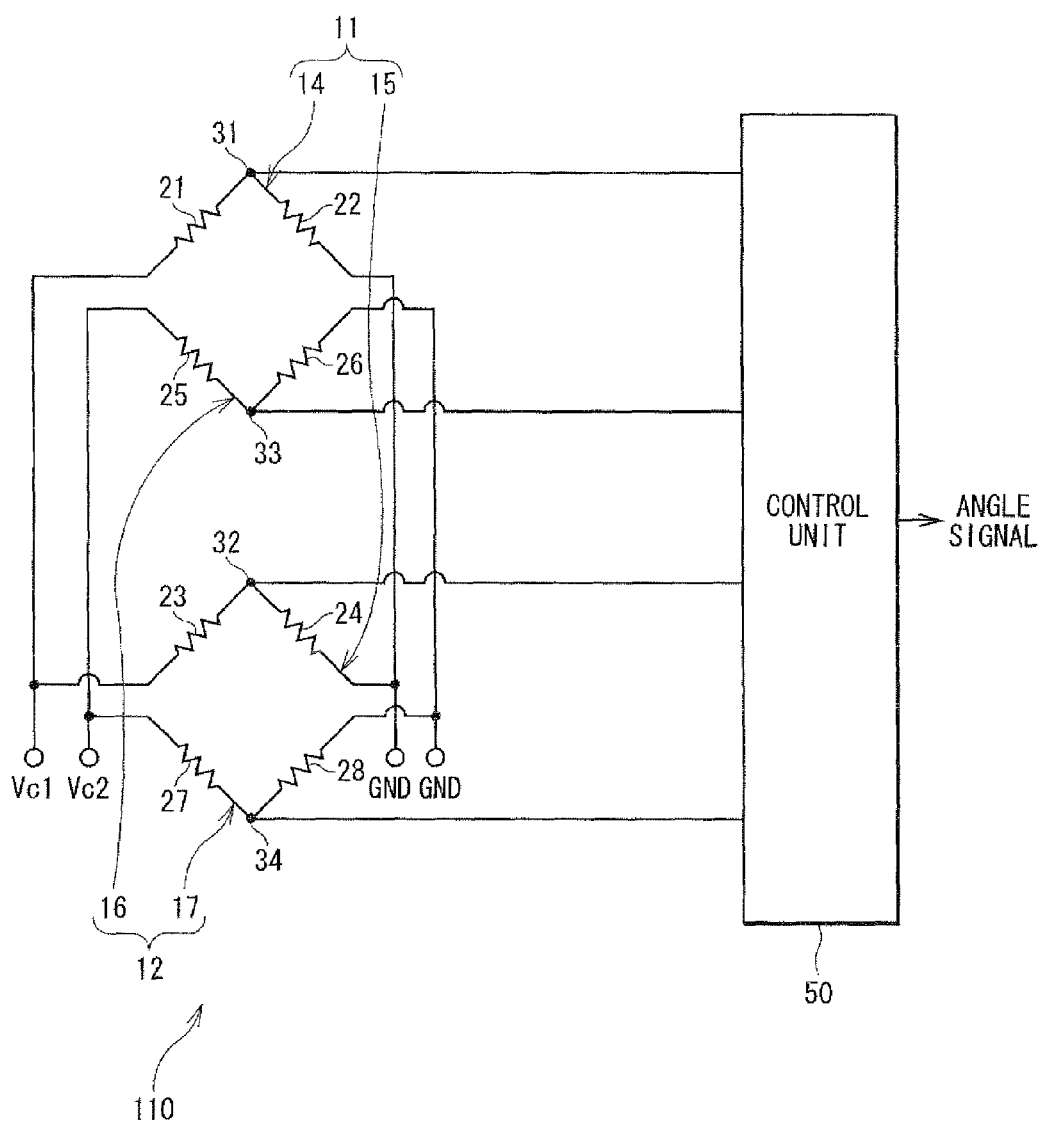
FIG. 17 is a circuit diagram showing a rotation angle detection device according a fourth embodiment of the present invention.

In place of providing the amplifier circuit 40 in the rotation angle detection device 10 or 100, a rotation angle detection device 110 may be configured to have no amplifier section as shown in FIG. 17. The output signals produced from the intermediate points 31 to 34 of the half bridges are directly applied to the control unit 50.

Figure 18:
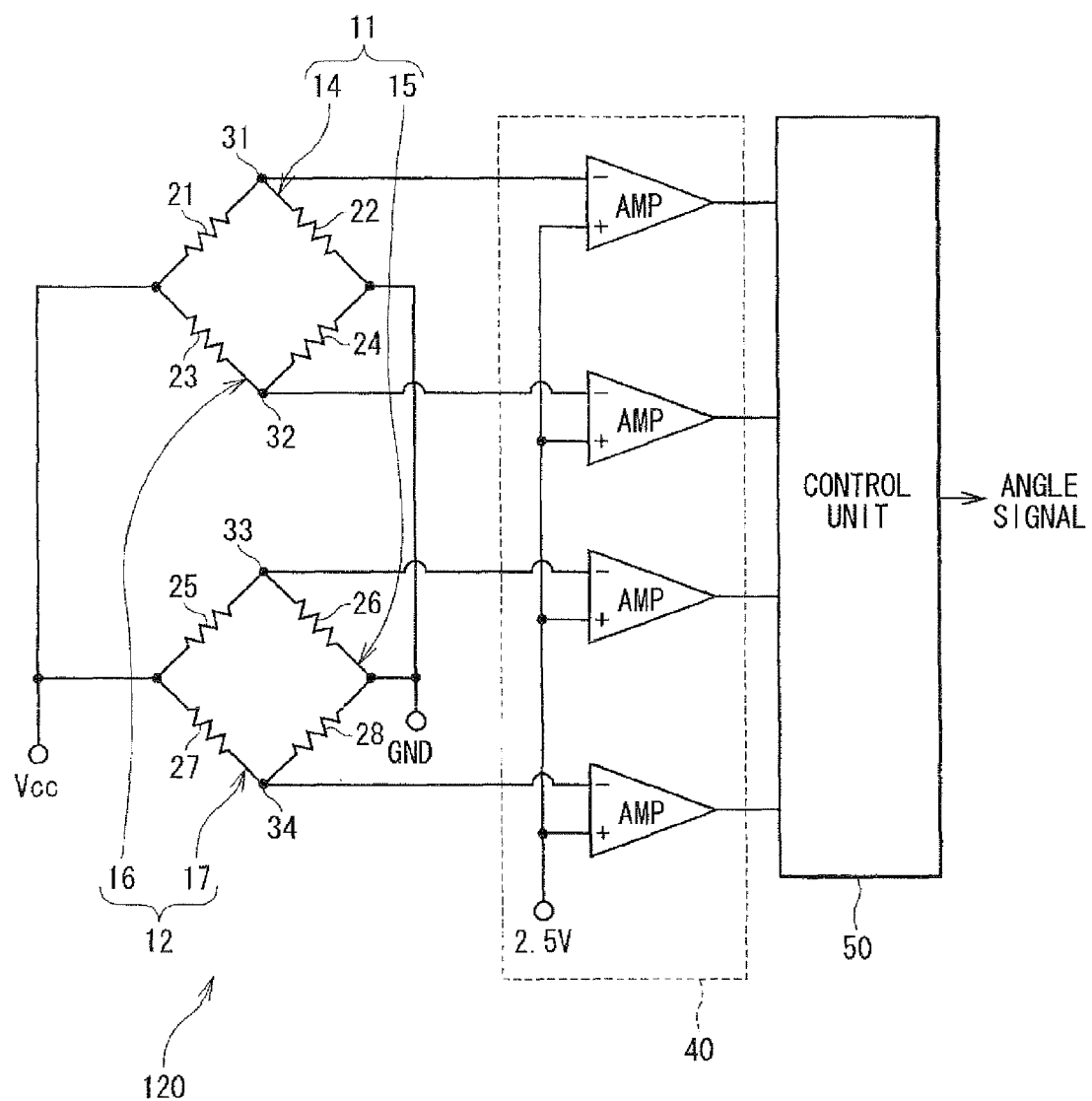
FIG. 18 is a circuit diagram showing a rotation angle detection device according a fifth embodiment of the present invention.

The rotation angle detection device 120 may be configured such that its two bridge circuits 12 and 12 are connected to the same electric power source Vcc as shown in FIG. 18. The output signals applied from one bridge circuit may be a cosine signal and a −cosine signal, and the output signals applied from the other bridge circuit may be a sine signal and a −sine signal.

The number of bridge circuits is not limited to two but may be three. The number of output signals applied to the control unit from the intermediate points of the half bridges may be any as far as it is equal to or more than four. In addition, the output signals are not limited to the cosine signals and the sine signals.

(B) Abnormality Detection Section

The calculation values may be the output signals per se. The abnormality may be determined when the output signal is outside a predetermined fourth range. For example, the abnormality determination section in the control unit 50 may determine that an output signal is abnormal if it is over the upper limit or under the lower limit of a predetermined range. For example, in case that the output signal is a sine wave signal and its minimum value and maximum value are 1V and 4V, respectively, under normal condition, the output signal may be determined to be abnormal if the output signal becomes higher than 4.5V or lower than 0.5V by setting the upper limit and the lower limit of the predetermined range to 4.5V and 0.5V, respectively. In this example, the fourth range corresponds to a range between 0.5V and 4.5V. It is thus possible to readily determine which one of the output signals is abnormal.

In place of calculating the rotation angle based on normal output signals other than the abnormal output signal or the external signal when the abnormality detection section determines that the output signal is abnormal, the rotation angle detection device may stop the rotation angle calculation.

In place of setting the sine signal, −sine signal, cosine signal and −cosine signal produced from the half bridges to have the same amplitude, the output signals may have different amplitudes among the half bridges. In this case, if the amplitudes of the output signals produced from the half bridges are known, the control unit may correct the amplitude and determine the abnormality of the output signal in the similar manner as the disclosed embodiments.

In place of using the rotation angle detection device in the electric power steering system, the rotation angle detection device may be used in other systems.

What is claimed is:

1. A rotation angle detection device comprising:
a plurality of bridge circuits including a plurality of half bridges, each of the half bridges including a sensor element varying an impedance thereof in response to rotating magnetic field generated by rotation of a reference part and the half bridges generating output signals from intermediate points, respectively; and
a control unit including a signal acquisition section for acquiring the output signals of the bridge circuits, a rotation angle calculation section for calculating a rotation angle of the reference part based on the output signals acquired by the signal acquisition section, and an abnormality determination section for determining an abnormal signal, which is one of the output signals having abnormality,
wherein the signal acquisition section acquires at least four output signals, which include sine-system signals, which are a sine signal and a −sine signal, and cosine-system signals, which are a cosine signal and a −cosine signal,
wherein the abnormality determination section calculates calculation values by using the at least four output signals and determines the abnormal signal among the output signals, the abnormal signal causing the calculation value to be outside a predetermined range, and
wherein the rotation angle calculation section calculates the rotation angle of the reference part based on the sine-system signals and the cosine-system signals, which are other than the abnormal signal, wherein:
the abnormality determination section calculates a plurality of first values, which comprise at least four square values of the output signals so that the square values of the sine signal, the −sine signal, the cosine signal and the −cosine signal are each calculated and calculates a plurality of second values by adding two of the first values so that the plurality of second values comprise at least four sum values;
the abnormality determination section determines the abnormal signal based on by which one of the output signals the second value is caused to be outside the predetermined range; and
wherein the abnormality determination section determines the abnormal signal based on which one of the four square values causes two of the four sum values to be outside the predetermined range.

2. The rotation angle detection device according to claim 1, wherein:
the abnormality determination section calculates each of the second values as $K(\sin^2 \theta + \cos^2 \theta)$ with K being a constant and θ being a rotation angle by using two of the first values.

3. The rotation angle detection device according to claim 2, wherein:
the abnormality determination section calculates one of the second values by a combination of two square values, one of which is the square value of the sine signal or the −sine signal and the other of which is the square value of the cosine signal or the −cosine signal.

4. The rotation angle detection device according to claim 2, wherein:

the abnormality determination section calculates the subtraction value by subtraction between two signals, one of which is the sine signal or the −sine signal and the other of which is the cosine signal or the −cosine signal.

5. The rotation angle detection device according to claim 1, wherein:
the abnormality determination section calculates the at least four second values based on at least four different combinations of the first values.

6. The rotation angle detection device according to claim 1, wherein:
the abnormality determination section calculates a sine signal value as one of the calculation values by using the sine signal and the −sine signal; and
the abnormality determination section determines the abnormal signal among the output signals, the abnormal signal causing the sine signal value to be outside the predetermined range.

7. The rotation angle detection device according to claim 1, wherein:
the abnormality determination section calculates a cosine signal value as one of the calculation values by using the cosine signal and the −cosine signal; and
the abnormality determination section determines the abnormal signal among the output signals, the abnormal signal causing the cosine signal value to be outside the predetermined range.

8. The rotation angle detection device according to claim 1, wherein:
each of the bridge circuits generates two of the output signals, one of which is the sine signal or the −sine signal and the other of which is the cosine signal or the −cosine signal.

9. The rotation angle detection device according to claim 1, wherein:
the abnormality determination section calculates the calculation values to be equal to the output signals; and
the abnormality determination section determines the abnormality signal among the output signals, the abnormal signal being outside the predetermined range.

10. The rotation angle detection device according to claim 1, wherein:
the bridge circuits are connected to different electric power sources, respectively.

11. The rotation angle detection device according to claim 1, wherein:
the reference part is provided on a shaft of an electric motor for an electric power steering system of a vehicle.

12. The rotation angle detection device according to claim 1, wherein:
the plurality of bridge circuits are formed of two bridge circuits, each of which is formed of two half bridges.

13. The rotation angle detection device according to claim 1, wherein:
the at least four sum values comprise a sum of the square values of the sine signal and the cosine signal, a sum of the square values of the sine signal and the −cosine signal, a sum of the square values of the −sine signal and the cosine signal, and a sum of the −sine signal and the −cosine signal.

14. A rotation angle detection device comprising:
a plurality of bridge circuits including a plurality of half bridges, each of the half bridges including a sensor element varying an impedance thereof in response to rotating magnetic field generated by rotation of a reference part and the half bridges generating output signals from intermediate points, respectively; and a control unit including a signal acquisition section for acquiring the output signals of the bridge circuits, a rotation angle calculation section for calculating a rotation angle of the reference part based on the output signals acquired by the signal acquisition section, and an abnormality determination section for determining an abnormal signal, which is one of the output signals having abnormality, wherein the signal acquisition section acquires at least four output signals, which include sine-system signals, which are a sine signal and a −sine signal, and cosine-system signals, which are a cosine signal and a −cosine signal, wherein the abnormality determination section calculates calculation values by using the at least four output signals including the sine signal, the −sine signal, the cosine signal and the −cosine signal and determines the abnormal signal among the output signals, the abnormal signal causing the calculation value to be outside a predetermined range, wherein the abnormality determination section calculates at least four first values, which are at least four square values of subtraction values determined by subtraction between two of the at least four output signals forming a combination of the sine-system signals including the sine signal and the −sine signal and the cosine-system signals including the cosine signal and the −cosine signal, and calculates at least four second values by adding two of the first values so that the least four sec values comprise at least four sum values, wherein the abnormality determination section calculates each of the second values as $K(\sin^2 \theta + \cos^2 \theta)$ with K being a constant and $\theta$ being a rotation angle by using two of the first values, and wherein the abnormality determination section determines the abnormal signal based on by which one of the at least four output signals including the sine signal, the −sine signal, the cosine signal and the −cosine signal the second value is caused to be outside the predetermined range when the second calculation value is outside the predetermined range; and wherein the abnormality determination section determines the abnormal signal based on which one of the four square values causes two of the four sum values to be outside the predetermined range.

15. The rotation angle detection device according to claim 14, wherein:
the reference part is provided on a shaft of an electric motor for an electric power steering system of a vehicle.

16. The rotation angle detection device according to claim 14, wherein:
the plurality of bridge circuits are formed of two bridge circuits, each of which is formed of two half bridges.

17. The rotation angle detection device according to claim 14, wherein:
the at least four sum values comprise a sum of the square values of the sine signal and the cosine signal, a sum of the square values of the sine signal and the −cosine signal, a sum of the square values of the −sine signal and the cosine signal, and a sum of the −sine signal and the −cosine signal.

* * * * *